Sept. 12, 1939.  A. J. ILLER  2,172,585
STEERING WHEEL PROTECTOR
Filed April 8, 1938
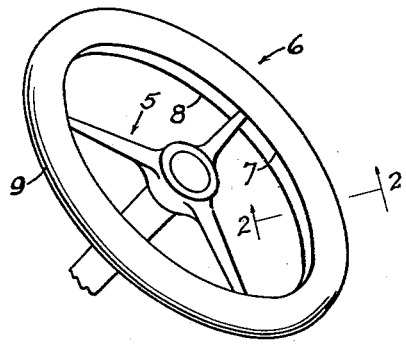
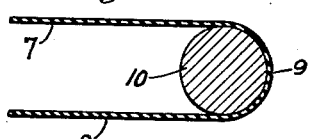
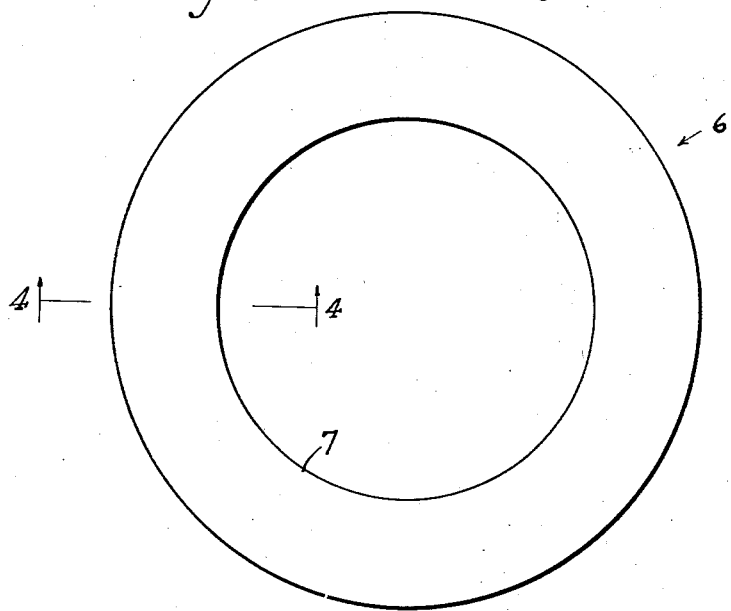
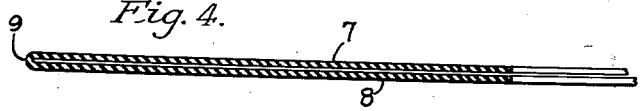
INVENTOR.
Alfred J. Iller
BY Carlos G. Stratton
ATTORNEY.

Patented Sept. 12, 1939

2,172,585

UNITED STATES PATENT OFFICE 2,172,585

STEERING WHEEL PROTECTOR

Alfred J. Iller, La Jolla, Calif., assignor of one-half to Hall G. Holder, La Jolla, Calif.

Application April 8, 1938, Serial No. 200,957

2 Claims. (Cl. 74—558)

My invention relates to a device for protecting the steering wheel of an automobile from grease, oil and the like, or to protect a driver's hands or gloves from grease, oil, or the like, on the steering wheel.

An object of the present invention is to provide a steering wheel protector that has flanges molded substantially in the planes in which they are intended to be when applied to a steering wheel, whereby the flanges of the protector will lie flat at the top and bottom of the steering wheel.

The invention also comprises novel details of construction and novel combinations and arrangements of parts, which will more fully appear in the course of the following description.

Reference is made to my co-pending application Serial No. 149,165, filed June 19, 1937, for subject matter shown and described but not claimed herein.

In the drawing, like reference characters designate similar parts in the several views.

Figure 1 is a broken, perspective view of a steering wheel to which has been applied an embodiment of my present invention.

Figure 2 is an enlarged section taken on the line 2—2 of Figure 1.

Figure 3 is a face view of said embodiment.

Figure 4 is an enlarged section taken on the line 4—4 of Figure 3.

Referring more in detail to the drawing, the reference numeral 5 generally designates a steering wheel to which has been applied my present steering wheel protector 6 of thin, limp rubber.

The protector 6 has flanges 7 and 8 connected by a bridging or rim member 9 which in use extends around the outer circumference of the wheel 10 of the steering wheel.

The protector is preferably molded substantially in the form shown in Figures 3 and 4. In this form the flanges 7 and 8 are molded substantially parallel while the circumference of the member 9 is preferably somewhat smaller than the circumference of the steering wheel 10, whereby the protector, which is made of elastic material, may be stretched over the wheel 10 and thereby firmly held in place.

In the use of my present invention, the protector 6 is drawn over the steering wheel 10 with the flanges 7 and 8 extending substantially the same distance inward toward the axis of the steering wheel. The elasticity of the protector 6, together with its somewhat smaller circumference than the wheel 10, causes the protector to firmly remain in position on the wheel.

It is to be understood that appropriate advertising may be applied to the flanges 7 and/or 8. Moreover, the protector may be made up in attractive colors in conformity with the color schemes of the advertisers, such as the color scheme of an oil company having a chain of filling stations.

While I have illustrated and described what I now regard as the preferred embodiment of my invention, the construction is, of course, subject to modifications without departing from the spirit of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. A steering wheel protector comprising a continuous elastic band of limp rubber of substantially uniform thickness having a fold at its outer circumference, the edges of the band being molded of smaller inner circumference than the circumference of the band at the fold, and the edges being of substantially the same width and being molded flat substantially parallel to each other, to lie in substantially parallel planes when applied to the steering wheel.

2. A steering wheel protector comprising a continuous elastic band of limp rubber of substantially uniform thickness having a fold at its outer circumference, the edges of the band being molded flat with the edges substantially together, when the protector is in a rest or non-stretched condition, and the edges being molded substantially parallel to each other.

ALFRED J. ILLER.